US012657485B2

(12) United States Patent
Zafar et al.

(10) Patent No.: US 12,657,485 B2
(45) Date of Patent: Jun. 16, 2026

(54) APPARATUS AND PARTICULARLY COMPUTER- IMPLEMENTED METHOD FOR NON-DETERMINISTIC TECHNICAL SYSTEMS

(71) Applicant: Robert Bosch GmbH, Stuttgart (DE)

(72) Inventors: Muhammad Bilal Zafar, Berlin (DE); Martin Schiegg, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1135 days.

(21) Appl. No.: 17/691,069

(22) Filed: Mar. 9, 2022

(65) Prior Publication Data

US 2023/0289628 A1     Sep. 14, 2023

(51) Int. Cl.
*G06N 5/04*           (2023.01)

(52) U.S. Cl.
CPC ....................................... *G06N 5/04* (2013.01)

(58) Field of Classification Search
CPC ........... G06N 5/04; G06N 20/00; G06N 20/20
See application file for complete search history.

(56) References Cited

U.S. PATENT DOCUMENTS

| | | | | |
|---|---|---|---|---|
| 2018/0082204 A1* | 3/2018 | Iwamasa | ................ | G05B 17/02 |
| 2020/0184373 A1* | 6/2020 | Yuan | ................... | G05B 23/0254 |
| 2021/0034982 A1 | 2/2021 | Sather et al. | | |

OTHER PUBLICATIONS

Alvarez, Mauricio A., Lorenzo Rosasco, and Neil D. Lawrence. "Kernels for vector-valued functions: A review." Foundations and Trends® in Machine Learning 4.3 (2012): 195-266. (Year: 2012).*
Bopardikar, Shaunak D., and George S. Eskander Ekladious. "Sequential Randomized Matrix Factorization for Gaussian Processes : Efficient Predictions and Hyper-parameter Optimization." arXiv preprint arXiv:1711.06989 (2017). (Year: 2017).*
Kanagawa, Motonobu, et al. "Gaussian processes and kernel methods: A review on connections and equivalences." arXiv preprint arXiv:1807.02582 (2018). (Year: 2018).*
Sadet, Jeremy, et al. "Deep Gaussian process for the approximation of a quadratic eigenvalue problem: Application to friction-induced vibration." Vibration 5.2 (2022): 344-369. (Year: 2022).*
Jakkala, Kalvik. "Deep Gaussian processes: A survey." arXiv preprint arXiv:2106.12135 (2021). (Year: 2021).*

* cited by examiner

*Primary Examiner* — Andrew T Chiusano
(74) *Attorney, Agent, or Firm* — NORTON ROSE FULBRIGHT US LLP

(57)           ABSTRACT

Apparatus and computer-implemented method, including: presetting data points which include pairs of mutually assigned input and output of a Gaussian process; determining a positive semi-definite kernel matrix from inputs predetermined by the data points; determining an inverse of the kernel matrix depending on an estimation for an inverse of a 1-Lipschitz mapping of the kernel matrix; presetting an input for the Gaussian process; determining a prediction for an expected value of the Gaussian process, and/or a prediction for a variance of the Gaussian process; determining a probable output variable of a sensor and/or a control variable for a machine depending on at least one of the predictions.

16 Claims, 4 Drawing Sheets

APPARATUS AND PARTICULARLY COMPUTER- IMPLEMENTED METHOD FOR NON-DETERMINISTIC TECHNICAL SYSTEMS

BACKGROUND INFORMATION

Behavior models of non-deterministic technical systems may be developed based on observations. Computationally elaborate operations with matrices are necessary to use such models for the operation of technical systems of that kind. This makes the practical use of these models difficult.

SUMMARY

Thanks to the particularly computer-implemented method and the apparatus according to present invention, an especially well-developable model of a technical system is provided and used for its operation.

In accordance with an example embodiment of the present invention, the particularly computer-implemented method includes the steps of: Presetting data points which include pairs of mutually assigned input and output of a Gaussian process; Determining a positive semi-definite kernel matrix from inputs that are predetermined by the data points; Determining an inverse of the kernel matrix depending on an estimation for an inverse of a 1-Lipschitz mapping of the kernel matrix, which is scaled depending on an estimated value for a dominant eigenvalue of the kernel matrix; Presetting an input for the Gaussian process; Determining a prediction for an expected value of the Gaussian process depending on at least one covariance from the positive semi-definite kernel matrix and depending on the inverse of the kernel matrix and depending on outputs from the data points, and/or a prediction for a variance of the Gaussian process depending on at least one covariance from the positive semi-definite kernel matrix and depending on the inverse of the kernel matrix; Determining a probable output variable of a sensor and/or a control variable for a machine depending on at least one of the predictions.

In accordance with an example embodiment of the present invention, preferably, the method includes: Determining a decomposition of the kernel matrix, which includes the estimated value for the particularly dominant eigenvalue of the kernel matrix and the estimation for the 1-Lipschitz mapping of the kernel matrix; Determining the estimation for the inverse of the 1-Lipschitz mapping depending on the estimated value for the 1-Lipschitz mapping; Determining the inverse of the kernel matrix depending on the estimation for the inverse of the 1-Lipschitz mapping and depending on the estimated value for the dominant eigenvalue, the estimation for the inverse of the 1-Lipschitz mapping being scaled depending on the estimated value for the dominant eigenvalue. This makes it possible to parallelize calculations. The computing speed is thereby increased.

In one aspect of the present invention, the mutually assigned input and output are predetermined depending on measured variables that are or were acquired by the sensor and/or at the machine. This permits especially good modeling of the machine. In another aspect, the mutually assigned input and output are predetermined depending on pseudo-measured variables that simulate measured variables able to be acquired by the sensor and/or at the machine. The pseudo-measured variables make it possible to model the same sensor or the same machine with a smaller amount of data than is possible when using measured variables.

In one aspect of the present invention, in a first iteration during operation of the sensor and/or the machine depending on the output at least one data point is acquired, in a second iteration, the prediction for the expected value of the Gaussian process and/or the prediction for the variance of the Gaussian process being determined depending on the at least one data point from the first iteration. In this manner, the accuracy of the prediction is improved by additional data points acquired during the operating time.

In one aspect of the present invention, the output is determined depending on at least one data point which is acquired by a first point in time during the operation of the sensor and/or the machine, a prediction for the output variable of the sensor and/or the control variable for the machine at a later point in time relative to the first point in time being determined depending on the output. A prediction of future variables, that is, variables not yet able to be acquired in a present computing step, is thus provided.

The method is versatile. The machine may be a robot, the control variable being a variable for controlling the robot, or the machine may be an internal combustion engine, the control variable being a variable for controlling the internal combustion engine, or the machine may be an injection valve, the control variable being a variable for controlling the injection valve, or the machine may include an energy accumulator, the control variable being a variable which represents an energy that is to be provided by the energy accumulator, or the machine may be an electric drive, the control variable being a variable which represents a power called for by the electric drive.

In accordance with an example embodiment of the present invention, a training may include determining at least one hyperparameter of the Gaussian process in a gradient-based method with a derivative of a function, the function defining a measure for a quality of the mapping by the Gaussian process depending on the inverse of the kernel matrix and a determinant of the kernel matrix. The parameters are adjusted automatically. To that end, a marginal probability is used, thus, a probability density for the data points as a measure for an agreement between the presumed Gaussian process and the existing data points. The parameters are optimized with the measure for the quality in such a way that this agreement becomes maximal. The Gaussian process is defined depending on an exponential function. For computing operations that are numerically more stable, the logarithm of this quality is therefore optimized, which leads to the same result, since the logarithm is a strictly monotonic function. The logarithm of the quality is what is referred to as the Log-Marginal-Likelihood-Function. The measure for the quality of the mapping by the Gaussian process, which is defined depending on the inverse of the kernel matrix and the determinant of the kernel matrix, may be determined in a particularly efficient manner.

In one aspect of the present invention, determining the derivative of the function includes determining a derivative of the inverse of the kernel matrix in accordance with the at least one hyperparameter and determining a derivative of the kernel matrix in accordance with the at least one hyperparameter.

The determination of the estimated value for the particularly dominant eigenvalue of the kernel matrix includes a first multiplication of a first row of the kernel matrix by an estimated variable for a dominant eigenvector of the kernel matrix on a first hardware module designed for that purpose and—particularly essentially overlapping in time with that—a second multiplication of a second row of the kernel matrix by the estimated variable on a second hardware module designed for that purpose. A significant acceleration of the determination of the estimated value is thus achieved on a special hardware, e.g., a graphical processing unit, GPU, or an embedded device with corresponding acceleration for a matrix-matrix product.

The determination of the estimated value for the particularly dominant eigenvalue of the kernel matrix may include determining the estimated variable in at least two iterations, the determination of the estimated value for the particularly dominant eigenvalue of the kernel matrix being terminated when a number of iterations is reached, or when the estimated variable in one iteration satisfies a condition, or when a change of the estimated variable in one iteration satisfies a condition compared to the estimated variable from the especially immediately preceding iteration. This offers a substantial advantage, since the determination of the estimated value may be terminated upon reaching high accuracy or at a predetermined number of iterations.

In addition, the method may include determining the estimation of the 1-Lipscitz mapping of the kernel matrix depending on a product of a reciprocal value of the estimated value for the dominant eigenvalue and the kernel matrix.

In addition, the method may include calculating the estimation for the inverse of the 1-Lipschitz mapping in at least two iterations, the estimation in one iteration being determined depending on a sum of the estimation of the inverse of the 1-Lipschitz mapping from an especially immediately preceding iteration and a change in the iteration, the change being determined depending on a product of the change in the especially immediately preceding iteration with a difference between an identity matrix and the estimation of the 1-Lipschitz mapping of the kernel matrix.

The calculation of the derivative of the function may include multiplication of a first matrix by a second matrix, a multiplication of at least one row of the first matrix by at least one column of the second matrix being determined on a first hardware module configured for that purpose and, particularly essentially overlapping in time with that, a multiplication of the at least one row or at least one other row of the first matrix by the at least one column or by at least one other column of the second matrix being determined on a second hardware module configured for that purpose.

The apparatus includes a computing device which is designed to carry out the method.

In one aspect of the present invention, the apparatus includes at least one sensor for acquiring the input and/or at least one actuator controllable depending on the output.

The computing device may include a first hardware module and a second hardware module, where the computing device—in order to calculate the derivative of the function which defines the measure for the quality of the mapping by the Gaussian process depending on the inverse of the kernel matrix and the determinate of the kernel matrix—is designed to multiply a first matrix by a second matrix, a multiplication of at least one row of the first matrix by at least one column of the second matrix being determined on a first hardware module configured for that purpose and, particularly essentially overlapping in time with that, a multiplication of the at least one row or at least one other row of the first matrix by the at least one column or by at least one other column of the second matrix being determined on a second hardware module configured for that purpose.

Further advantageous developments may be derived from the following description and the figures.

DETAILED DESCRIPTION OF EXAMPLE EMBODIMENTS

Figure 1:
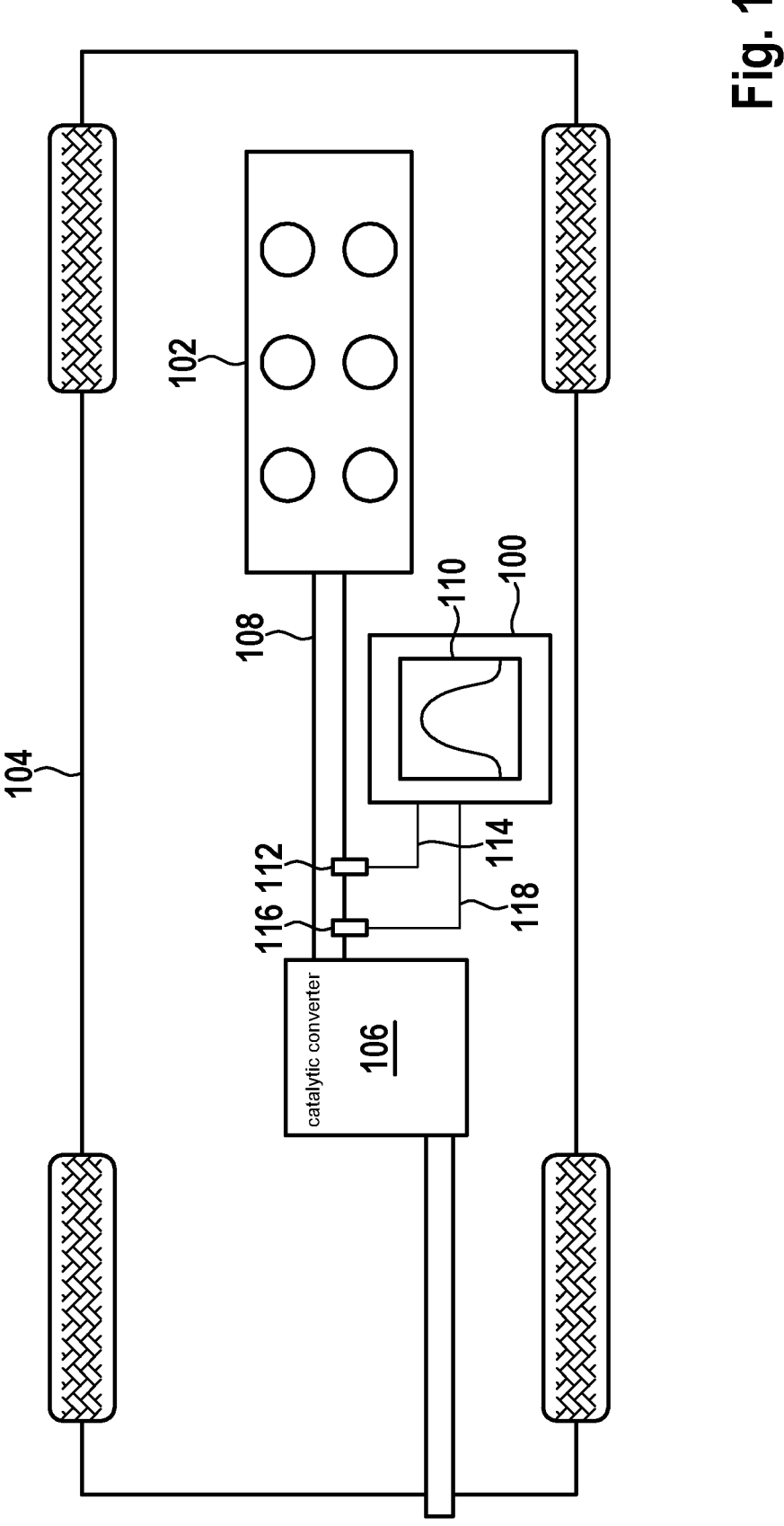
FIG. 1 shows a schematic representation of a first device for controlling an internal combustion engine, in accordance with an example embodiment of the present invention.

In the following, a Gaussian process GP is described for inputs $x \in R^d$ and outputs $y \in R$ of a technical system, which is defined by its hyperparameters $\theta = (\sigma, l)$ as follows:

$$GP(\mu, k)$$

with an expected-value function $$\mu: R^d \to R$$

with a covariance function $$k: R^d \times R^d \to R$$

For n data points $$\{(x_i, y_i)\}_{i=1}^{n} = (X, Y),$$

a n×n kernel matrix $K_{XX}$ includes a covariance between the inputs $x_i$ from the n pairs, all inputs of data points $$\{(x_i, y_i)\}_{i=1}^{n}$$

being collected in rows in a matrix $X \in R^{n \times d}$ and all associated outputs being collected in a vector $Y \in R^n$. In the example, the elements of kernel matrix $K_{XX}$ are defined by a quadratically exponential kernel $$k(x, x') = \sigma^2 \exp\left(-\frac{\|x - x'\|^2}{2l^2}\right)$$

which depends on hyperparameters $\theta = (\sigma, l)$. One of the inputs $x_i$ is denoted by x. One of the inputs $x_i$ is denoted by x'. For an arbitrary input x*, a vector $k_{Xx*}$ represents a covariance between an arbitrary x* and the n inputs $x_i$ from the n pairs. The Gaussian process GP is a model which is defined by data points $$\{(x_i, y_i)\}_{i=1}^n.$$

is a further data point which may be set as desired and does not have to be included in data points $$\{(x_i, y_i)\}_{i=1}^n.$$

It may be provided that a noise, which may occur due to observation of inputs, is to be taken into account by a modified kernel matrix $$K'_{XX}:$$

$$K'_{XX} = K_{XX} + \sigma_v^2 I$$

where I is an identity matrix and $\sigma_v$ is a standard deviation of the noise. In this aspect, hyperparameter $\theta=(\sigma, 1, \sigma_v)$ is made up additionally of the parameter for the standard deviation of the noise.

Hyperparameters $\theta$ may be predetermined. Hyperparameters $\theta=(\sigma,1)$ or $\theta=(\sigma, 1, \sigma_v)$ are trainable optionally in a training with the n data points $$\{(x_i, y_i)\}_{i=1}^n.$$

The training may be carried out by maximizing a criterion $$MLL = \frac{1}{2}\log p(Y|X, \theta) = -Y^T K'^{-1}_{XX} Y - \log\det(K'_{XX}) + C,$$

This criterion is denoted hereinafter as log marginal likelihood, MLL. In this criterion, C represents a constant that is independent of hyperparameters $\theta$. Constant C therefore does not have to be taken into account in the maximizing. The maximizing may be accomplished using a gradient-based method.

A closed-form representation of a derivative of the MLL in accordance with the j-th dimension $\theta_j$ of hyperparameters $\theta$ is $$\frac{\partial MLL}{\partial \theta_j} \propto Y^T K'_{XX} \frac{\partial K'^{-1}_{XX}}{\partial \theta_j} K'_{XX} Y - \text{trace}\left(K'^{-1}_{XX} \frac{\partial K'_{XX}}{\partial \theta_j}\right)$$

For the data point represented by input x*, a prediction for the expected value is defined by:

$$m(x^*) = \mu(x^*) + k_{Xx*}^T K'^{-1}_{XX} Y,$$

A prediction for the variance is defined by:

$$s(x^*) = k(x^*, x^*) - k_{Xx*}^T K'^{-1}_{XX} k_{Xx*}$$

Calculation of an inverse $$K'^{-1}_{XX}$$

of kernel matrix $$K'_{XX}$$

is necessary for these predictions.

Using these predictions, an output y* is determinable, onto which Gaussian process GP maps input x*.

For the training of hyperparameters $\theta$, in addition, it is necessary to calculate a derivative of the term $$\log \det(K'_{XX})$$

in accordance with hyperparameters $\theta$.

These calculations are possible using a conventional Cholesky decomposition, which, however, requires $O(n^3)$ sequential operations, that is, these operations must be carried out one after the other. Because of the necessary matrix calculations, a parallel calculation is not possible. These calculations must be carried out completely and exactly.

In contrast, the procedure described in the following is suitable for parallel calculations. In addition, a trade-off may be made between required exactness of a result and a required computing time, and the method may be adjusted accordingly. To that end, the calculation of the inverse $$K'^{-1}_{XX}$$

of the kernel matrix $$K'_{XX}$$

and/or the term $$\log \det(K'_{XX})$$

and/or the derivative of the term $$\log \det(K'_{XX})$$

may be terminated if a criterion is satisfied.

The method represents an estimation of a result of the complete and exact calculation. For example, the criterion is satisfied when a continuation of the method does not further improve the estimation or when a further improvement to be expected by continuing the method is less than a setpoint.

For problems with large matrices, this is a considerable advantage compared to conventional procedures.

Using the procedure described in the following, it is also possible to train a Gaussian process on a device whose computing resources are limited.

For instance, this device may include a specific hardware module for calculating a multiplication of one matrix by another matrix. However, this device needs no specific hardware module for calculating an inverse matrix.

Using the procedure described in the following, the calculation of a multiplication of one matrix by another matrix may be subdivided into sub-calculations, and individual sub-calculations may be carried out in a manner overlapping in time or in parallel with each other on multiple computing resources. This makes it possible to employ specific hardware modules, e.g., graphical processing units, GPU, for carrying out the sub-calculations. As a consequence, the calculation of a result of the mapping of input x* to output y* of the Gaussian process is possible faster than is possible with the same accuracy of the result using a conventional method. The calculation of the result of the Gaussian process is also possible with greater accuracy than is possible with the same expenditure of time using a conventional method.

This procedure is suitable generally for training the Gaussian process. For example, the Gaussian process trained by the method may be the model of a machine. The model may model a drivetrain of a motor vehicle or a component of the drivetrain. The model may model a catalytic converter, particularly for the motor vehicle. The model may also model emissions and/or an energy consumption of a motor vehicle. The model may model the emissions or the energy consumption for a motor vehicle having a combustion engine and/or having an electric drive. The model may model a sensor. For example, the model may model a sensor which measures an output quantity of the drivetrain in a conventional motor vehicle. As a result, it is possible to omit this sensor in a motor vehicle, in which the model is used instead for determining the output quantity.

In one aspect, the Gaussian process is utilized for modeling safety-related sensors. For example, safety-related sensors are sensors whose signals are used by control systems to control the safety-related components of a machine in closed or open loop. In a motor vehicle, these may be driving functions for driver assistance or avoidance of accidents or functions for at least partially autonomous driving of the motor vehicle.

Values of measurable quantities are able to be acquired as measuring points by a sensor. However, a sensor is not suitable for predicting values in the future.

In one aspect, the Gaussian process is used predictively. For example, using the Gaussian process, a measuring point is determined from values of one measurable quantity or multiple measurable quantities acquired in the past, the measuring point including a prediction for a value of a measurable quantity or a prediction for values of multiple measurable quantities that could occur in the future. For instance, depending on one historical and/or instantaneous measuring point or a plurality of these measuring points, one measuring point or a plurality of measuring points in the future are determined using the Gaussian process.

In this case, the model is trained to predict an output in the future from present and/or historical quantities at the input.

In one aspect, the sensor may remain in the vehicle. In one aspect, the sensor may acquire and/or provide new measuring points continuously, that is, at periodic or random or predetermined points in time, during its operation. These measuring points may be used to alter the model.

In one aspect, these measuring points are utilized as additional data points for training the model. For instance, these additional data points are added to already existing data points. In this aspect, a calculation of an inverse $$K_{XX}'^{-1}$$

of kernel matrix $$K_{XX}'$$

depending on the already existing and the additional data points is provided for the training and for the predictions. The hyperparameters $\theta$ do not necessarily have to be adjusted. For the training of hyperparameters $\theta$, in addition, a derivative of the criterion MLL may be calculated in accordance with hyperparameters $\theta$.

Applications which use Gaussian processes for Bayesian optimizations may likewise use the procedure described in the following. For example, the Gaussian process is trained for modeling an A-priori probability to optimize a manufacturing process, which runs on a machine.

The Gaussian process may also be trained for regression, that is, prediction of a particularly scalar output for one or more inputs. The Gaussian process may also be trained for classifying one or more inputs.

The procedure described below may be utilized in the cases indicated.

In the following example, with the aid of FIG. 1, a device 100 is described which is configured to control an internal combustion engine 102. Device 100 may include one specific hardware module or multiple specific hardware modules. Device 100 in the example is a control unit for a vehicle 104. Vehicle 104 in the example also includes internal combustion engine 102. Vehicle 104 in the example includes a catalytic converter 106. Catalytic converter 106 in the example is designed for selective catalytic reduction, SCR. Catalytic converter 106 is connected in the example to internal combustion engine 102 via an exhaust-system branch 108. Exhaust gas, which is formed during a combustion in internal combustion engine 102, is conducted in the example via exhaust-system branch 108 through catalytic converter 106. Device 100 in the example is designed to control internal combustion engine 102 depending on NOx emissions which remain in the exhaust gas after the exhaust gas has passed through catalytic converter 106.

In conventional vehicles, a sensor which measures a measured value for the NOx emissions is provided at the output or downstream of the output of catalytic converter 106.

Instead of the measured value, in the example, a prediction of the NOx emissions is determined using a model 110. In vehicle 104, a sensor 112 is provided in exhaust-system branch 108 between internal combustion engine 102 and catalytic converter 106, sensor 112 being designed to acquire a measured value for the NOx emission upstream of catalytic converter 106. Device 100 is configured, utilizing model 110, to determine the prediction depending on the measured value for the NOx emissions upstream of catalytic converter 106.

In the example, model 110 is a Gaussian process $p(y*|x*, X, Y, \theta)$. The prediction is an output $y*$ of Gaussian process $p(y*|x*, X, Y, \theta)$. Output $y$ in the example is determined depending on n data points $$\{(x_i, y_i)\}_{i=1}^{n}.$$

In one example, the n data points $$\{(x_i, y_i)\}_{i=1}^{n}$$

are determined during a development phase. In another example, the n data points $$\{(x_i, y_i)\}_{i=1}^{n}$$

are determined at least partially while model 110 is already being used in the operation of device 100.

Second sensor 116 is disposed in such a way that the NOx measured values represent the NOx emissions in the exhaust gas upstream of catalytic converter 106. In the example, sensor 112 is connected via a first line 114 to device 100. Sensor 112 is designed to transmit a signal, which represents these NOx measured values or NOx emissions, to device 100. Device 100 is designed to map the NOx measured value, which is transmitted in the signal from sensor 112, to one control signal or multiple control signals for internal combustion engine 102 and/or catalytic converter 106. Device 100 is designed in the example to control an injection valve 116 for the injection of urea. Injection valve 116 is disposed between internal combustion engine 102 and catalytic converter 106 in exhaust-system branch 108. In the example, a second line 118 for transmitting the control signal connects device 100 to injection valve 116.

In the following example, with the aid of FIG. 2, a device 200 is described which is configured to control an internal combustion engine 202. Device 200 in the example is a control unit for a vehicle 204. Vehicle 204 in the example also includes internal combustion engine 202. Vehicle 204 in the example includes a catalytic converter 206. Catalytic converter 206 in the example is designed for selective catalytic reduction, SCR. Catalytic converter 206 is connected in the example to internal combustion engine 202 via an exhaust-system branch 208. Exhaust gas, which is formed during a combustion in internal combustion engine 202, is conducted in the example via exhaust-system branch 208 through catalytic converter 206. Device 200 in the example is designed to control internal combustion engine 202 depending on NOx emissions which remain in the exhaust gas after the exhaust gas has passed through catalytic converter 206.

Figure 2:
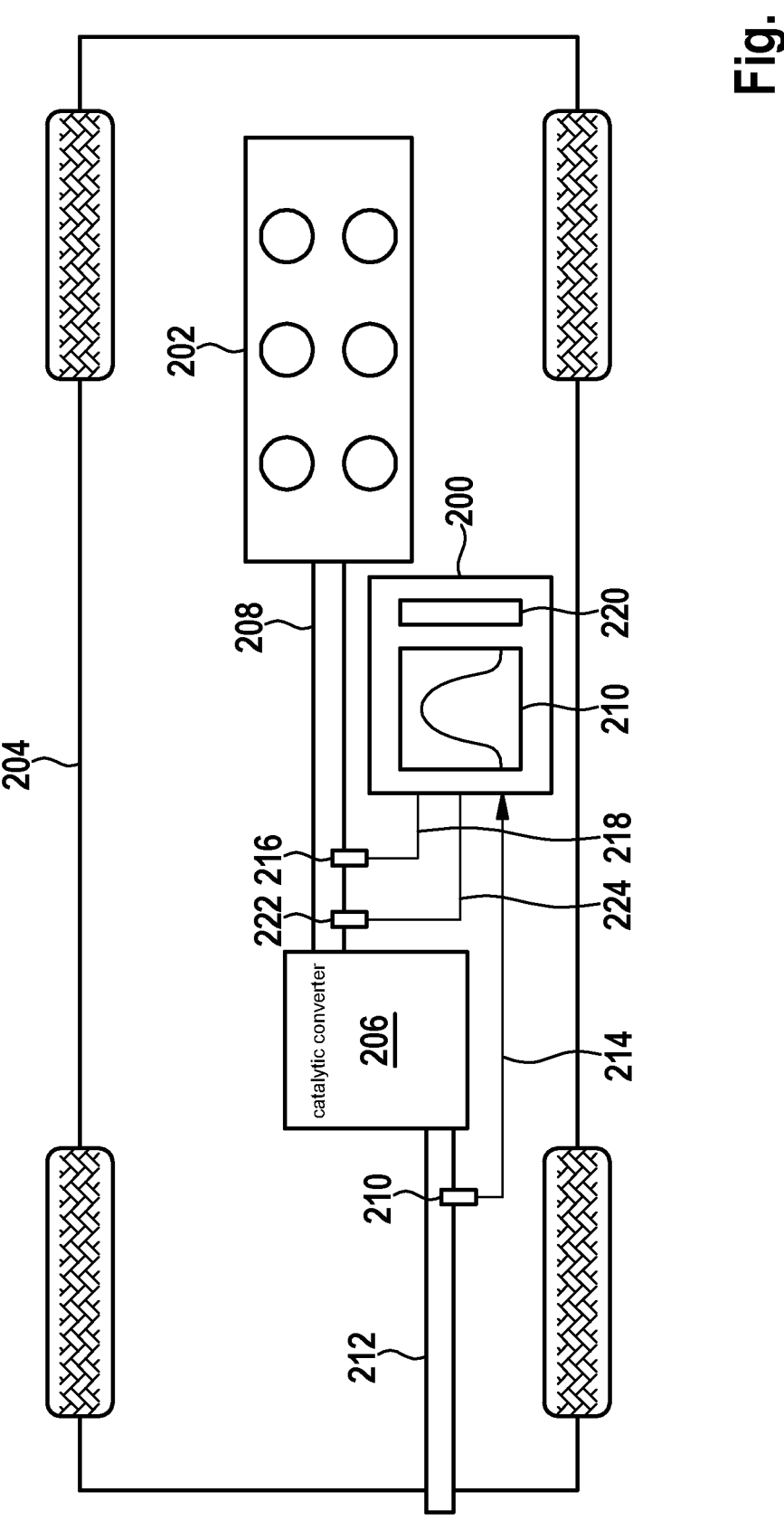
FIG. 2 shows a schematic representation of a second device for controlling the internal combustion engine, in accordance with an example embodiment of the present invention.

In vehicle 204 represented in FIG. 2, a first sensor 210 is provided which is designed to acquire NOx measured values. First sensor 210 is disposed in such a way that the NOx measured values represent the NOx emissions which remain in the exhaust gas after the exhaust gas has passed through catalytic converter 206. In the example, first sensor 210 is disposed in an exhaust pipe 212 through which the exhaust gas emerges from catalytic converter 206. First sensor 210 is connected in the example via a first line 214 to device 200. First sensor 210 is designed to transmit a first signal, which represents the NOx measured values or NOx emissions, to device 200. In the example, a second sensor 216, which is designed to acquire NOx measured values, is disposed in exhaust-system branch 208. Second sensor 216 is disposed in such a way that the NOx measured values represent the NOx emissions in the exhaust gas upstream of catalytic converter 206. Second sensor 216 is connected in the example via a second line 218 to device 200. Second sensor 216 is designed to transmit a second signal, which represents these NOx measured values or NOx emissions, to device 200. Device 200 is designed to map the NOx measured value, which is transmitted in the first signal from sensor 210, to one control signal or multiple control signals for internal combustion engine 202 and/or catalytic converter 206. In the example, a control signal is provided for a quantity of urea to be injected through catalytic converter 206. Device 200 includes a memory 220 for data points $$\{(x_i, y_i)\}_{i=1}^{n}.$$

Device 200 is designed in the example to control an injection valve 222 for the injection of urea. Injection valve 222 is disposed between internal combustion engine 202 and catalytic converter 206 in exhaust-system branch 208. In the example, a third line 224 for transmitting the control signal connects device 200 to injection valve 222. In this example, x denotes an input for model 210, which includes the NOx measured value from second sensor 216. In addition, input x in the example may include other characteristic values for a combustion in internal combustion engine 202 or for the exhaust gas. In this example, y denotes the output for model 210, which includes the NOx measured value from first sensor 210. Device 200 is designed to acquire data points $$\{(x_i, y_i)\}_{i=1}^{n}$$

and to store them in memory 220. Device 200 may also be designed to carry out the training, described in the following, using data points $$\{(x_i, y_i)\}_{i=1}^{n}.$$

The training may also be carried out on a server outside of vehicle 204.

The internal combustion engines described may be structurally identical. The internal combustion engines described may instead differ structurally. The catalytic converters described may be structurally identical. The catalytic converters described may instead differ structurally. The exhaust-system branches described may be structurally identical. The exhaust-system branches described may instead also differ structurally.

In the example, sensor 210 is not installed in vehicle 104 whose catalytic converter 102 is controlled by device 100 with the aid of model 110. After the training with the n data points $$\{(x_i, y_i)\}_{i=1}^{n},$$

model 110 therefore represents a virtual sensor 210. After the training, model 110 is transferred to device 100 in a manufacturing method for device 100.

One may proceed correspondingly for other types of emissions. Model 110 may model them instead of the NOx emissions or together with the NOx emissions.

Vehicle 104 may be controlled by the prediction of these emissions, e.g., in order to reduce unwanted emissions and consequently to reduce or avoid a negative effect on the environment.

In the following example, with the aid of FIG. 3, a device 300 is described which is configured to control an electric drive 302 of a vehicle 304. Vehicle 304 includes an energy accumulator 306, which is able to supply electric drive 302 with energy.

Energy accumulator 306 may be a battery or a fuel cell or may include these. Device 300 is designed to adjust the power which electric drive 302 draws from energy accumulator 306, or the energy which is provided by energy accumulator 306. Device 300 is designed to control an electronic system 308 for controlling energy accumulator 306 via a line 310.

In addition, in one aspect, device 300 is adapted to determine a prognosis about the power which electric drive 302 will draw from energy accumulator 306 in the future. In one aspect, the device is also designed to determine a prognosis about the energy which is to be provided by energy accumulator 306 in the future.

In both aspects, the prognosis is contingent on a future driving behavior of the driver.

In the example, device 300 is designed to determine the prognosis using a model 312. Better management of the energy accumulator is thereby possible, for example, by displaying information about the prognosis to the driver on a human-machine interface 314.

In the example, model 312 is a Gaussian process. An output y* of a Gaussian process $p(y^*|x^*, X, Y, \theta)$ is determined in the example depending on n data points $$\{(x_i, y_i)\}_{i=1}^{n}.$$

In the example, notably the n data points $$\{(x_i, y_i)\}_{i=1}^{n}$$

are determined in part during the operation of vehicle 304. In one aspect, "in part" in this context means that vehicle 304 is delivered with a pre-trained model 312. For example, pre-trained model 312 includes k data points $$\{(x_i, y_i)\}_{i=1}^{k},$$

where $0 < k < n$. In this aspect, $n-k$ additional data points are determined during the operation. Device 300 is designed in the example to carry out the training of the Gaussian process during the operation of vehicle 304. In one aspect, device 300 is adapted to carry out the training during the operation of vehicle 304 in one driving cycle. The driving cycle begins in the example after vehicle 304 is switched on and ends in the example with a shutdown of vehicle 304. In one aspect, device 300 is designed to determine the prognosis in the same driving cycle in which the training is carried out. Device 300 may be adapted to train model 312 in one driving cycle and to use it in another driving cycle without further training for the prognosis. Device 300 may be designed to carry out the training over multiple driving cycles. Device 300 may be designed to carry out the prognosis over multiple driving cycles without carrying out the training in these driving cycles. Device 300 may be designed to execute steps for the training of model 312 and to determine the prognosis depending on model 312 thus trained. Device 100 may be adapted to carry out the training again according to this prognosis.

Device 300 includes a memory 316 for data points $$\{(x_i, y_i)\}_{i=1}^{n}.$$

In this example, x denotes an input for model 312, which includes the energy provided by energy accumulator 306 and/or the power drawn from energy accumulator 306 by electric drive 302. In addition, input x in the example may include other characteristic values for the management of the energy accumulator. In this example, y denotes an output for model 312, which includes the prognosis. In the example, the prognosis includes the power which electric drive 302 will draw from the energy accumulator 306 in the future and/or the energy to be provided by energy accumulator 306 in the future.

Device 300 is designed to acquire data points $$\{(x_i, y_i)\}_{i=1}^{n}$$

and to store them in memory 316. Device 300 may also be designed to carry out the training, described in the following, using the data points $$\{(x_i, y_i)\}_{i=1}^{n}.$$

The training may also be carried out on a server outside of vehicle 304.

Figures 3, 4:
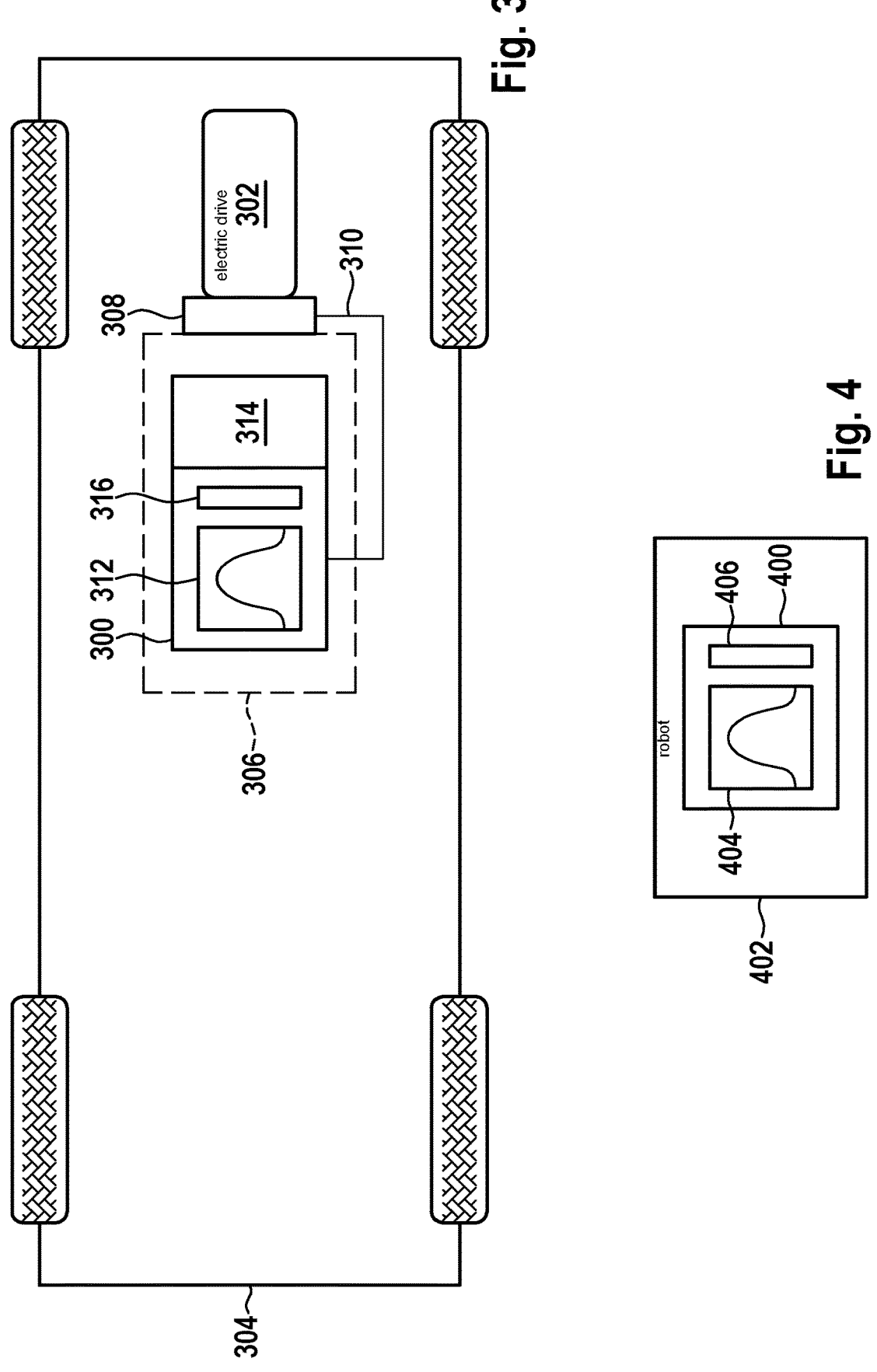
FIG. 3 shows a schematic representation of a device for controlling a component of an electric drive, in accordance with an example embodiment of the present invention.
FIG. 4 shows a schematic representation of a device for controlling a robot, in accordance with an example embodiment of the present invention.

In FIG. 4, a device 400 is represented schematically, which is designed to control a robot 402 likewise represented schematically. Device 400 is designed to control robot 402 depending on a model 404.

For a partially autonomous control of a robot, a digital image may be provided as input x and a control variable for robot 402 may be provided as output y of model 404. The digital image may be an optical image, a radar image, an ultrasonic image or a LIDAR image. In the example, robot 402 includes a camera 406 which is designed to capture digital images of an area surrounding robot 402. From a multitude of these images, which represent the robot and/or its surroundings, in conjunction with respective control variables assigned to the individual images, data points $$\{(x_i, y_i)\}_{i=1}^{n}$$

may be predetermined for the training. In the example, camera 406 is integrated into device 400. Camera 406 may also be located outside of device 400 or outside of robot 402.

A number of such cameras may also be provided, which preferably cover different areas of robot 402 and/or the surrounding area.

The images may represent objects in a traffic infrastructure. An object may be a traffic light, a road surface or road marking, a pedestrian or a vehicle.

The images may represent objects in a working environment of the robot. An object may be an article, a holder location for the article, a mounting location for the article or an operator of the robot.

Instead of or in addition to images, audio data may be provided as input x. The audio data may include signals or commands in natural language.

Device 400 may be designed to classify an image and/or audio data using model 404. In this case, the control variable represents a class. Device 400 may be designed to predetermine a program sequence for robot 402 depending on the class.

Robot 402 may be a vehicle, a household appliance, a manufacturing machine or an access control system or part thereof.

Figure 5:
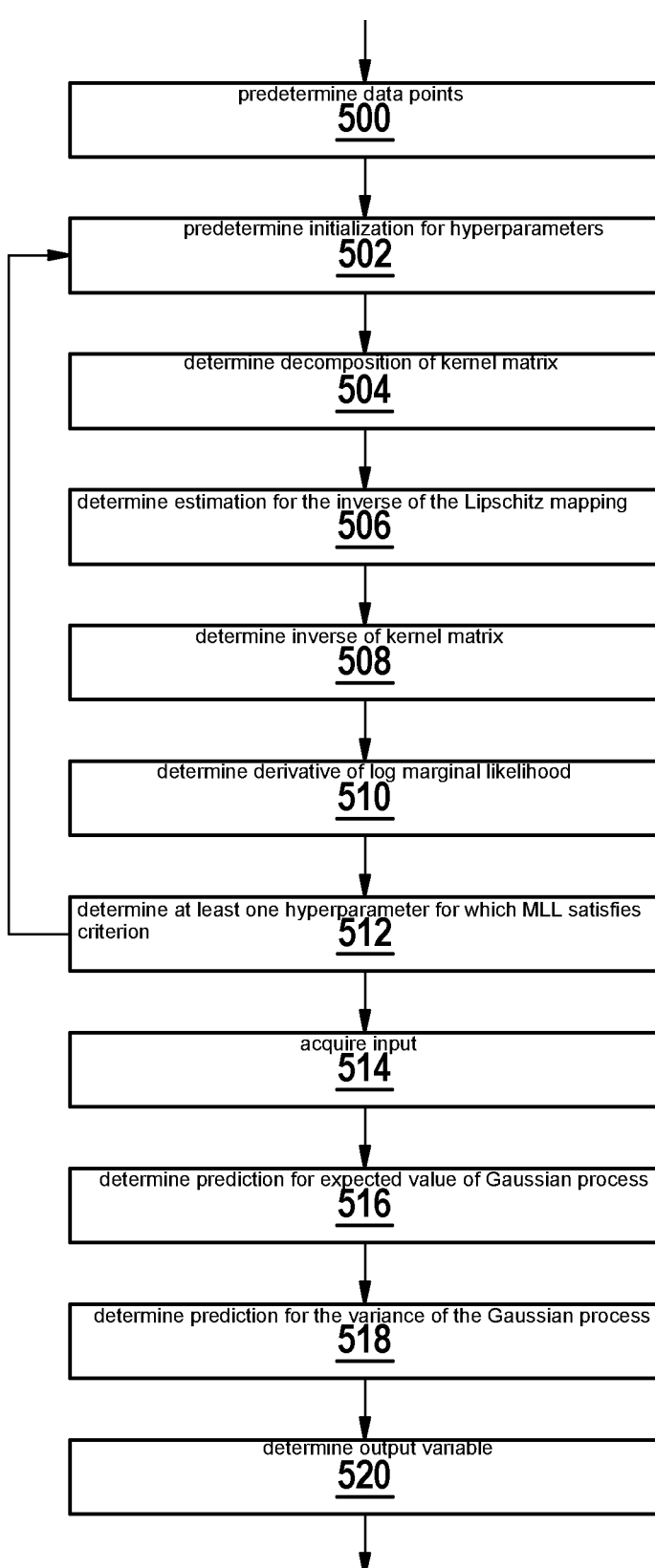
FIG. 5 shows steps in a method able to run on one of the devices, in accordance with an example embodiment of the present invention.

With reference to FIG. 5, methods are indicated in the following for determining the variables which may be used to determine hyperparameters θ and for the predictions described.

The calculation of the inverse $$K_{XX}'^{-1}$$

of the kernel matrix $$K_{XX}'$$

and the calculation of the derivative of the term $$\log \det(K_{XX}')$$

are carried out with the complexity $O(tn^3)$. A configurable parameter is denoted by t. The difference from a calculation utilizing the Cholesky decomposition is that routines of the calculation are able to be parallelized. For example, the matrix multiplications may be carried out on the GPU. A further difference from a calculation utilizing the Cholesky decomposition is that the calculation is able to be stopped. For example, the calculation may be stopped upon reaching a desired accuracy. The calculation may be stopped after a desired computing time period, for instance, or at a predetermined point in time. The result which exists when the calculation of inverse $$K_{XX}'^{-1}$$

of kernel matrix $$K_{XX}'$$

is stopped may be used as approximation for inverse $$K_{XX}'^{-1}$$

of kernel matrix $$K_{XX}'.$$

The result which exists when the calculation of the derivative of the term $$\log \det(K_{XX}')$$

of kernel matrix $$K_{XX}'$$

is stopped may be used as approximation for the derivative of the term $$\log \det(K_{XX}')$$

of kernel matrix $$K_{XX}'.$$

This is not possible in the case of a Cholesky decomposition, since it must be calculated serially and therefore always completely before a result that is usable as inverse $$K_{XX}'^{-1}$$

of kernel matrix $$K_{XX}'$$

or derivative of the term $$\log \det(K_{XX}')$$

of kernel matrix $$K_{XX}'$$

is available at all.

The use of superscript and subscript indices is omitted in the following in order to increase readability. The procedure is based on a predetermined, positive semi-indefinite kernel matrix K.

Calculation of the inverse $K^{-1}$:

In a step 500, data points $$\{(x_i, y_i)\}_{i=1}^n$$

are predetermined, which include pairs of input x and output y assigned to each other.

In a step 502, a positive semi-definite kernel matrix K is determined from inputs x,x'. The elements $$k(x, x') = \sigma^2 \exp\left(-\frac{\|x - x'\|^2}{2l^2}\right)$$

of kernel matrix K indicate the covariance between input x and input x', and are defined in the example depending on the hyperparameters $\theta=(\sigma,l)$.

For example, in a first execution of step 502, an initialization is predetermined for hyperparameters $\theta$. The initialization may provide that any, particularly random values $\sigma$, l or values $\sigma$, l preset by a user are determined for hyperparameters $\theta=(\sigma,l)$. It may also be provided that hyperparameters $\theta$ already determined previously by the procedure described in the following are used.

It may also be provided that during executions of step 502 following the first execution of step 502, instead of these hyperparameters $\theta=(\sigma,l)$, other hyperparameters $\theta=(\sigma,l)$ are used, which are determined depending on inputs x and outputs y from data points $$\{(x_i, y_i)\}_{i=1}^n,$$

as described in the following.

A step 504 is then carried out.

504: Determining a decomposition of kernel matrix K. The decomposition includes an estimated value c for a particularly dominant eigenvalue of kernel matrix K and an estimated value $K_{|1|}$ for a 1-Lipschitz mapping of kernel matrix K.

Step 504 may include the following sub-steps:

1 Predetermining a starting variable $z_0$ for an estimation of a dominant eigenvector of kernel matrix K. Starting variable $z_0$ may be a random variable.

2 Determining an estimated variable $z_j$ for the dominant eigenvector of kernel matrix K. Estimated variable $z_j$ is determined iteratively in the example. Beginning at j=0, estimated variable $z_j$ in one iteration j+1 is determined depending on a product $K_{z_j}$ of kernel matrix K with estimated variable $z_j$ of an especially immediately preceding iteration j. The product $K_{z_j}$ is normalized preferably depending on its amount $\|Kz\|$:

$$z_{j+1} = \frac{Kz_j}{\|Kz_j\|}$$

In the example, j is increased in each case by 1. The calculation may be continued in these iterations until this calculation converges. The calculation in these iterations is terminated in the example when the result satisfies a condition. For example, the condition is satisfied when a change in the result in terms of amount drops below a threshold value. For instance, an L2 norm of a difference $z_{j+1}-z_j$ of the estimated variables of two especially immediately consecutive iterations is determined. In this example, the condition is satisfied when the L2 norm of the difference is less than the threshold value.

Estimated variable $z_j$ approximates this eigenvector with an accuracy which is dependent on the number of iterations. Thus, the accuracy and/or the computing time period is selectable by selecting the number of iterations. In the example, a number of iterations may be predetermined as condition, after which the calculation is terminated.

3 Determining the estimated value c for the particularly dominant eigenvalue of kernel matrix K depending on estimated variable $z_j$ for the dominant eigenvector of kernel matrix K and depending on kernel matrix K.

$$c = \frac{z_j^T K z_j}{z_j^T x_j}$$

In the example, the eigenvalue is the largest singular value of kernel matrix K. The accuracy of the estimation of the eigenvalue is subject to the accuracy of estimated variable z.

4 Determining the estimation $K_{|1|}$ of the 1-Lipschitz mapping of kernel matrix K depending on a product of a reciprocal value of estimated value c for the dominant eigenvalue and kernel matrix K.

$$K_{|1|} = \frac{1}{c}K$$

A step 506 is then carried out.

Step 506: Determining an estimation $$K_{|1|}^{-1}$$

for the inverse of the Lipschitz mapping.

Step 506 may include the following sub-steps:

1 Presetting a starting variable for an estimation of a change A of estimation $$K_{|1|}^{-1}$$

of the inverse. In the example, the starting variable for an estimation of change A is an identity matrix I.

2 Presetting a starting variable for the estimation $$K_{|1|}^{-1}$$

of the inverse of the 1-Lipschitz mapping. In the example, the starting variable for estimation $$K_{|1|}^{-1}$$

of the inverse is an identity matrix I.

3 Determining the estimation $$K_{|1|}^{-1}$$

for the inverse of the 1-Lipschitz mapping. Estimation $$K_{|1|}^{-1}$$

for the inverse of the 1-Lipschitz mapping is provided iteratively in the example.

Beginning at a first iteration r=0, in which the starting variable for the estimation of change A and the starting variable for estimation $$K_{|1|}^{-1}$$

of the inverse of the 1-Lipschitz mapping are used, in an iteration r+1, a magnitude of change A in iteration r+1 is determined. In the example, this magnitude of change A is determined depending on a product of the magnitude of change A in the especially immediately preceding iteration r with a difference between an identity matrix I and estimation $K_{|1|}$ of the 1-Lipschitz mapping of kernel matrix K:

$$A \leftarrow A(I - K_{|1|})r = 0$$

Estimation $$K_{|1|}^{-1}$$

of the inverse of the 1-Lipschitz mapping is determined depending on a sum of estimation $$K_{|1|}^{-1}$$

of the inverse of the 1-Lipschitz mapping from the especially immediately preceding iteration r and this estimation of change A:

$$K_{|1|}^{-1} \leftarrow K_{|1|}^{-1} + A$$

This iterative calculation is based on a Neumann series $$K_{|1|}^{-1} = \sum_{m=0}^{\infty} (I - K_{|1|})^m$$

The Neumann series converges when the spectral radius of the term $I-K_{|1|}$ is less than zero. This is the present case: Based on the predetermined positive semi-definite property of kernel matrix K, the eigenvalues of $-K_{|1|}$ lie between 0 and −1; the eigenvalues of identity matrix I are 1. Therefore, the eigenvalues of the term $I-K_{|1|}$ overall lie between 0 and 1.

The iterative calculation may be terminated after a predetermined number of iterations. The iterative calculation may be terminated when a distance measure, e.g., a Frobenius norm, between two especially immediately successive estimations $$K_{|1|}^{-1}$$

satisfies a condition. The condition may be that the distance measure is less than a threshold value for it.

A step 508 is then carried out.

Step 508: Determining the inverse $K^{-1}$ of kernel matrix K depending on estimation $$K_{|1|}^{-1}$$

of the inverse of the 1-Lipschitz mapping and the reciprocal value of estimated value c for the dominant eigenvalue $$K^{-1} = c^{-1}K_{|1|}^{-1}$$

This means that the 1-Lipschitz mapping is scaled depending on estimated value c for the dominant eigenvalue.

In one aspect, it is provided to add one or more further data points to the data points during utilization, particularly during the operating time of the model, and to determine the inverse of the covariance matrix once more. This increases the accuracy of the model Optionally, hyperparameters θ may be adjusted. Hyperparameters θ do not necessarily have to be adjusted.

In an optional step 510, the derivative $$\frac{\partial MLL}{\partial \theta}$$

of the log marginal likelihood, MLL is determined:

As described in the following, derivative $$\frac{\partial MLL}{\partial \theta}$$

is determined depending on the inverse $K^{-1}$ of kernel matrix K. The partial derivatives $$\frac{\partial MLL}{\partial \theta_j}$$

in accordance with the elements $\theta_j$ of hyperparameters θ are formed in the manner described below. For better readability, for each of the partial derivatives in accordance with scalar elements of a vector, which includes hyperparameters θ, the index j is omitted in the following.

For the calculation of the MLL, the inverse $K^{-1}$ of kernel matrix K is already known from the calculation described for it. For determining the derivative $$\frac{\partial MLL}{\partial \theta},$$

the derivative $$\frac{\partial \log\det(K)}{\partial \theta}$$

of the term log det(K) in accordance with hyperparameters θ is necessary. Starting from the positive semi-definite kernel matrix K, the following applies based on the chain rule for the derivative of the term log det(K) in accordance with hyperparameters θ:

$$\frac{\partial \log\det(K)}{\partial \theta} = \frac{\partial \log\det(K)}{\partial K}\frac{\partial K}{\partial \theta} = \left(K^{-1}\right)^T \frac{\partial K}{\partial \theta} = \mathrm{trace}\left(K^{-1}\frac{\partial K^{-1}}{\partial \theta}\right).$$

In this case, the determinant det(K) of kernel matrix K is not negative, since kernel matrix K is positive semi-definite.

In one aspect, the derivative $$\frac{\partial MLL}{\partial \theta}$$

in closed form $$Y^T K \frac{\partial K^{-1}}{\partial \theta} KY - \mathrm{trace}\left(K^{-1}\frac{\partial K^{-1}}{\partial \theta}\right)$$

is determined depending on kernel matrix K and depending on a derivative $$\frac{\partial K^{-1}}{\partial \theta}$$

of inverse $K^{-1}$ of kernel matrix K in accordance with one element of hyperparameters θ. In this aspect, this derivative may be determined with the aid of automatic differentiation. A conventional algorithm for automatic differentiation is used for this step in the example.

An optional step 512 is then carried out.

In optional step 512, the at least one hyperparameter θ for which the MLL satisfies one criterion is determined.

The at least one hyperparameter θ defines at least one element of kernel matrix K. The at least one hyperparameter θ is determined in such a way that the MLL satisfies the criterion. The intention in the example is to maximize the MLL. The gradient-based optimization method is used in the example. Utilizing the gradient-based optimization method, in the example, the at least one hyperparameter θ is determined for which the MLL satisfies the criterion. To that end, the optimization method determines a gradient step, with which the hitherto existing hyperparameters θ=(σ,l) are altered. Step 502 then follows again. These steps are repeated optionally until the MLL satisfies the criterion. Instead of determining at least one hyperparameter θ which maximizes the MLL, the at least one hyperparameter θ for which the MLL exceeds a threshold value may also be provided as solution.

Steps 502 to 512 may be repeated during a training. The method may end when the training is concluded. To utilize the model thus trained, the method may be continued with a step 514.

In step 514, an input x* is acquired, which is to be mapped with the Gaussian process p(y*|x*, X, Y, θ) thus trained.

The prediction of the Gaussian process for the input x conditioned to the observed data points X, Y are the expected value $$m(x^*) = \mu(x^*) + k_{Xx}^T * K_{XX}'^{-1} Y$$

and the variance $$s(x^*) = k(x^*, x^*) - k_{Xx}^T * K_{XX}'^{-1} k_{Xx^*}$$

of a normal distribution N:

$$p(y^*|x^*, X, Y, \theta) = N(m(x^*), s(x_*))$$

Input x* is acquired at a machine. The machine may be internal combustion engine 102, internal combustion engine 202, electric drive 302 or robot 402. For example, the acquisition is carried out as described for one of the devices adapted for that, particularly with the sensors described there. The machine may be of the same construction as the machine with which the training was carried out. The machine may be of a construction differing from the machine with which the training was carried out.

An optional step 516 is then carried out.

Step 516 includes determining the prediction for the expected value $$m(x^*) = \mu(x^*) + k_{Xx^*}^T K_{XX}'^{-1} Y$$

of the Gaussian process p(y*|x*, X, Y, θ) depending on at least one covariance $$k_{Xx^*}^T$$

from positive semi-definite kernel matrix K and depending on the inverse $$K_{XX}'^{-1}$$

of kernel matrix $$K_{XX}'$$

and depending on outputs Y from data points $$\{(x_i, y_i)\}_{i=1}^n.$$

Instead of determining the prediction for the expected value in step 516, a previous prediction may also be used, without having to determine the prediction once again.

An optional step 518 is then carried out.

Step 518 includes determining the prediction for the variance $$s(x^*) = k(x^*, x^*) - k_{Xx^*}^T K_{XX}'^{-1} k_{Xx^*}$$

of the Gaussian process p(y*|x*, X, Y, θ) depending on at least one covariance $$k_{Xx^*}^T$$

from positive semi-definite kernel matrix K and depending on the inverse $$K_{XX}'^{-1}$$

of kernel matrix $$K_{XX}'.$$

In the example, steps 516 and 518 are not carried out prior to the training. In the training, all variables necessary for the training are calculated in the MLL.

Steps 516 and 518 are carried out in the example in order, from an input x* which was acquired at the machine, to calculate an output of the Gaussian process p(y*|x*, X, Y, θ) for this input. Either the expected value m(x*) or the variance s(x*) or both is/are determined as output. In using the Gaussian process p(y*|x*, X, Y, θ), the three following cases are differentiated in this example:

1. Determining a most probable sensor value: To that end, the input x* is acquired at the machine and the expected value m(x*) is determined using the Gaussian process p(y*|x*, X, Y, θ). This expected value m(x*) is output in the example as most probable sensor value.

2. Determining whether input x* lies close to the training data, that is, data points $$\{(x_i, y_i)\}_{i=1}^n$$

for the training. To that end, the extent to which input x* is covered by training data used in the training is quantified utilizing the trained Gaussian process p(y*|x*, X, Y, θ). For example, it may be determined whether or not this input x* should be incorporated as a further point into the model. In this case, the variance s(x*) predicted by Gaussian process p(y*|x*, X, Y, θ) is determined for input x*.

3. Determining the most probable sensor value and quantifying how reliable the model is: In this case, both the expected value predicted by Gaussian process p(y*|x*, X, Y, θ) and the variance s(x*) predicted by Gaussian process p(y*|x*, X, Y, θ) are determined for an input x* acquired at the machine.

It may be provided, particularly depending on an input by a user, to selectively carry out either step 516 or step 518 or both. The method may be adapted for one specific purpose and may include only one of steps 516 or 518.

A step 520 is then carried out.

In step 520, an output variable e(x*) is determined depending on at least one of the predictions. For example, output variable e(x*) includes a probable output variable of a sensor and/or a control variable for the machine. The probable output variable of the sensor in the example is a prediction of a sensor value which a sensor would measure at a point in time at which variables are acquired at the machine that define the input for the Gaussian process.

For instance, output variable e(x*) for input x* is determined selectively depending on expected value m(x*), variance s(x*) or both.

Output variable e(x*) may include expected value m(x*), and the most probable sensor value may be expected value m(x*) or may be determined depending on it. In this case, the most probable sensor value may be output and/or the machine may be controlled depending on the most probable sensor value. Output variable e(x*) may include expected value m(x*), and the control variable for the machine may be expected value m(x*) or may be determined depending on it. In this case, the machine may be controlled depending on the control variable for the machine.

Output variable e(x*) may be the variance s(x*), input x* being added to data points $$\{(x_i, y_i)\}_{i=1}^n$$

if output variable e(x*) is greater than a threshold value. In this case, the data points thus augmented are preset upon re-execution of step 500, and the steps following step 500 are carried out again.

In one aspect, output variable e(x*) includes expected value m(x*) and variance s(x*).

In this aspect, the most probable sensor value may be expected value m(x*) or may be determined depending on it. In this case, the most probable sensor value may be output if variance s(x*) is less than a threshold value, and otherwise, no output of the most probable sensor value takes place.

In this case, it may be provided that the most probable sensor value is output if variance s(x*) is less than a threshold value, and otherwise, a different model is used to determine the most probable sensor value.

In this case, the most probable sensor value may be output, and if variance s(x*) is greater than a threshold value, in addition, a warning may be output.

In these cases, the machine may be controlled depending on the most probable sensor value, provided it is output.

In this aspect, the control variable for the machine may be expected value m(x*) or may be determined depending on it, and variance s(x*).

In this case, it may be provided that the machine is controlled depending on the control variable if variance s(x*) is less than a threshold value, and otherwise, no control of the machine takes place.

In this case, it may be provided that the machine is controlled depending on the control variable if variance s(x*) is less than a threshold value, and otherwise, a different model is used to determine the control variable.

In this case, the machine may be controlled depending on the control variable, and if variance s(x*) is greater than a threshold value, in addition, a warning may be output.

Output variable e(x*) may be the control variable for the machine. In this case, the machine may be controlled depending on output variable e(x*).

In one aspect, output variable e(x*) is determined depending on at least one data point $$\{(x_i, y_i)\}_{i=1}^n$$

which is acquired by a first point in time t during the operation of the sensor and/or the machine.

In this aspect, a prediction for the output variable of the sensor and/or the control variable for the machine at a later point in time t+r relative to the first point in time t is determined depending on output variable e(x*). With r>0, the output variable of the sensor and/or the control variable for the machine at an arbitrary point in time in the future is/are predicted.

The output variable of the sensor and/or the control variable for the machine is/are determined in the example as described for the devices mentioned. For example, for device 100 or device 200, the prediction of the NOx emissions is determined as output. For instance, the prognosis as output is determined by device 300. The control variable or the program sequence is determined as output for device 400, for example.

In another aspect, a sparsely occupied Gaussian process may be used. In this case, pseudo-outputs $v \in R$ with respect to predetermined pseudo-inputs $u \in R^d$ are learned as parameters. In this case, in addition to the elements k(x,x'), kernel matrix K also includes elements k(u,u'), k(u,x), k(x,u). In this case, hyperparameters $\theta$ additionally include pseudo-outputs $v_1, \ldots, v_M$, where M defines a number of the pairs of pseudo-inputs and pseudo-outputs (u,v). This number is able to be parameterized.

In this case, the derivative $$\frac{\partial K^{-1}}{\partial \theta}$$

and the expression $$\frac{\partial \log \det(K)}{\partial \theta}$$

are calculated as described above, that is, additionally in accordance with the pseudo-outputs v.

The specific hardware modules may be realized as hardware accelerators.

What is claimed is:

1. A computer-implemented method, comprising:
presetting data points which each include pairs of mutually assigned input and output of a Gaussian process;
determining a positive semi-definite kernel matrix from inputs that are predetermined by the data points;
determining an inverse of the kernel matrix depending on an estimation for an inverse of a 1-Lipschitz mapping of the kernel matrix, which is scaled depending on an estimated value for a dominant eigenvalue of the kernel matrix;

presetting an input for the Gaussian process;
determining: (i) a prediction for an expected value of the Gaussian process depending on at least one covariance from the positive semi-definite kernel matrix and depending on the inverse of the kernel matrix and depending on outputs from the data points, and/or (ii) a prediction for a variance of the Gaussian process depending on at least one covariance from the positive semi-definite kernel matrix and depending on the inverse of the kernel matrix;
determining a probable output variable of a sensor and/or a control variable for a machine depending on at least one of the predictions;
determining a decomposition of the kernel matrix, which includes the estimated value for the dominant eigenvalue of the kernel matrix and the estimation for the 1-Lipschitz mapping of the kernel matrix;
determining the estimation for the inverse of the 1-Lipschitz mapping depending on the estimated value for the 1-Lipschitz mapping;
determining the inverse of the kernel matrix depending on the estimation for the inverse of the 1-Lipschitz mapping and depending on the estimated value for the dominant eigenvalue, the estimation for the inverse of the 1-Lipschitz mapping being scaled depending on the estimated value for the dominant eigenvalue;
wherein the determination of the estimated value for the dominant eigenvalue of the kernel matrix includes a first multiplication of a first row of the kernel by an estimated variable for the dominant eigenvector of the kernel matrix on a first hardware module, and a second multiplication of a second row of the kernel matrix by the estimated variable on a second hardware module, wherein the first and second multiplications overlap in time with one another;
wherein the first and second hardware modules are a hardware accelerator;
wherein the method further comprises:
measuring, by a first sensor, NOx emissions in exhaust gas conducted by an internal combustion engine via an exhaust-system branch, upstream of a catalytic converter, wherein the first sensor is situated in the exhaust-system branch between the internal combustion engine and the catalytic converter;
wherein the presetting of the input for the Gaussian process presets the input to the measured NOx emissions from the first sensor;
wherein the determining of the prediction for the expected value of the Gaussian process includes determining the prediction for the expected value of the Gaussian process depending on the at least one covariance from the positive semi-definite kernel matrix and depending on the inverse of the kernel matrix and depending on outputs from the data points and the measured NOX emissions;
determining, based on the prediction of the expected value of the Gaussian process, a probable output value of a second sensor; and
controlling the internal combustion engine based on the probable output value of the second sensor.

2. The method as recited in claim 1, wherein: (i) the mutually assigned input and output are predetermined depending on measured variables that are or were acquired by the sensor and/or at the machine, or (ii) the mutually assigned input and output are predetermined depending on pseudo-measured variables that simulate measured variables able to be acquired by the sensor and/or at the machine.

3. The method as recited in claim 1, wherein in a first iteration during operation of the sensor and/or the machine, depending on the output, at least one data point is acquired, in a second iteration, the prediction for the expected value of the Gaussian process and/or the prediction for the variance of the Gaussian process being determined depending on the at least one data point from the first iteration.

4. The method as recited in claim 1, wherein the output is determined depending on at least one data point which is acquired by a first point in time during operation of the sensor and/or the machine, a prediction for the output variable of the sensor and/or the control variable for the machine at a later point in time relative to the first point in time being determined depending on the output.

5. The method as recited in claim 1, further comprising: determining at least one hyperparameter of the Gaussian process in a gradient-based method with a derivative of a function, the function defining a measure for a quality of the mapping by the Gaussian process depending on the inverse of the kernel matrix and a determinant of the kernel matrix.

6. The method as recited in claim 5, wherein a determination of the derivative of the function includes determining a derivative of the inverse of the kernel matrix in accordance with the at least one hyperparameter and determining a derivative of the kernel matrix in accordance with the at least one hyperparameter.

7. The method as recited in claim 6, wherein the determination of the estimated value for the dominant eigenvalue of the kernel matrix includes a first multiplication of a first row of the kernel matrix by an estimated variable for a dominant eigenvector of the kernel matrix on a first hardware module configured for that purpose and, overlapping in time with that, a second multiplication of a second row of the kernel matrix by the estimated variable on a second hardware module configured for that purpose.

8. The method as recited in claim 7, wherein the determination of the estimated value for the dominant eigenvalue of the kernel matrix includes determining the estimated variable in at least two iterations, the determination of the estimated value for the dominant eigenvalue of the kernel matrix being terminated when a number of iterations is reached, or when the estimated variable in one iteration satisfies a condition, or when a change of the estimated variable in one iteration satisfies a condition in comparison to the estimated variable from an immediately preceding iteration.

9. The method as recited in claim 5, wherein the calculation of the derivative of the function includes multiplication of a first matrix by a second matrix, a multiplication of at least one row of the first matrix by at least one column of the second matrix being determined on one of the first and second hardware modules and, overlapping in time with that, a multiplication of the at least one row or at least one other row of the first matrix by the at least one column or by at least one other column of the second matrix being determined on another of the first and second hardware modules.

10. The method as recited in claim 1, further comprising: determining the estimation of the 1-Lipschitz mapping of the kernel matrix depending on a product of a reciprocal value of the estimated value for the dominant eigenvalue and the kernel matrix.

11. The method as recited in claim 1, further comprising: calculating the estimation for the inverse of the 1-Lipschitz mapping in at least two iterations, the estimation in one iteration being determined depending on a sum of the estimation of the inverse of the 1-Lipschitz mapping from an immediately preceding iteration and a change in the iteration, the change being determined depending on a product of the change in the immediately preceding iteration with a difference between an identity matrix and the estimation of the 1-Lipschitz mapping of the kernel matrix.

12. An apparatus, comprising:
a computing device configured to:
   preset data points which each include pairs of mutually assigned input and output of a Gaussian process;
   determine a positive semi-definite kernel matrix from inputs that are predetermined by the data points;
   determine an inverse of the kernel matrix depending on an estimation for an inverse of a 1-Lipschitz mapping of the kernel matrix, which is scaled depending on an estimated value for a dominant eigenvalue of the kernel matrix;
   preset an input for the Gaussian process;
   determine: (i) a prediction for an expected value of the Gaussian process depending on at least one covariance from the positive semi-definite kernel matrix and depending on the inverse of the kernel matrix and depending on outputs from the data points, and/or (ii) a prediction for a variance of the Gaussian process depending on at least one covariance from the positive semi-definite kernel matrix and depending on the inverse of the kernel matrix;
   determine a probable output variable of a sensor and/or a control variable for a machine depending on at least one of the predictions;
   determine a decomposition of the kernel matrix, which includes the estimated value for the dominant eigenvalue of the kernel matrix and the estimation for the 1-Lipschitz mapping of the kernel matrix;
   determine the estimation for the inverse of the 1-Lipschitz mapping depending on the estimated value for the 1-Lipschitz mapping;
   determine the inverse of the kernel matrix depending on the estimation for the inverse of the 1-Lipschitz mapping and depending on the estimated value for the dominant eigenvalue, the estimation for the inverse of the 1-Lipschitz mapping being scaled depending on the estimated value for the dominant eigenvalue;
   wherein the determination of the estimated value for the dominant eigenvalue of the kernel matrix includes a first multiplication of a first row of the kernel by an estimated variable for the dominant eigenvector of the kernel matrix on a first hardware module, and a second multiplication of a second row of the kernel matrix by the estimated variable on a second hardware module, wherein the first and second multiplications overlap in time with one another;
   wherein the first and second hardware modules are a hardware accelerator;
   wherein the computing device is further configured to:
      acquire at least one digital image using a camera of an at least partially autonomous robot, the at least digital image being at least one image of an area surrounding the robot;
      wherein the presetting of the input for the Gaussian process presets the input to the acquired at least one digital image;
      wherein the determining of the prediction for the expected value of the Gaussian process includes determining the prediction for the expected value of the Gaussian process depending on the at least one covariance from the positive semi-definite kernel matrix and depending on the inverse of the kernel matrix and depending on outputs from the data points and the acquired at least one digital image;

determine, based on the prediction of the expected value of the Gaussian process, a control variable for the robot; and control the robot based on the control variable.

13. The apparatus as recited in claim 12, further comprising:

at least one sensor configured to acquire the input and/or at least one actuator controllable depending on the output.

14. The apparatus as recited in claim 12, wherein the computing device includes the first hardware module and the second hardware module, where the computing device, to calculate the derivative of the function which defines a measure for a quality of the mapping by the Gaussian process depending on the inverse of the kernel matrix and the determinate of the kernel matrix, is configured to multiply a first matrix by a second matrix, a multiplication of at least one row of the first matrix by at least one column of the second matrix being determined on one of the first and second hardware modules and, overlapping in time with that, a multiplication of the at least one row or at least one other row of the first matrix by the at least one column or by at least one other column of the second matrix being determined on another of the first and second hardware modules.

15. A non-transitory machine-readable medium on which is stored a computer program including machine-readable instructions, the instructions when executed by a computer, causing the computer to perform the following steps:

presetting data points which each include pairs of mutually assigned input and output of a Gaussian process;

determining a positive semi-definite kernel matrix from inputs that are predetermined by the data points;

determining an inverse of the kernel matrix depending on an estimation for an inverse of a 1-Lipschitz mapping of the kernel matrix, which is scaled depending on an estimated value for a dominant eigenvalue of the kernel matrix;

presetting an input for the Gaussian process;

determining: (i) a prediction for an expected value of the Gaussian process depending on at least one covariance from the positive semi-definite kernel matrix and depending on the inverse of the kernel matrix and depending on outputs from the data points, and/or (ii) a prediction for a variance of the Gaussian process depending on at least one covariance from the positive semi-definite kernel matrix and depending on the inverse of the kernel matrix;

determining a probable output variable of a sensor and/or a control variable for a machine depending on at least one of the predictions;

determining a decomposition of the kernel matrix, which includes the estimated value for the dominant eigenvalue of the kernel matrix and the estimation for the 1-Lipschitz mapping of the kernel matrix;

determining the estimation for the inverse of the 1-Lipschitz mapping depending on the estimated value for the 1-Lipschitz mapping;

determining the inverse of the kernel matrix depending on the estimation for the inverse of the 1-Lipschitz mapping and depending on the estimated value for the dominant eigenvalue, the estimation for the inverse of the 1-Lipschitz mapping being scaled depending on the estimated value for the dominant eigenvalue;

wherein the determination of the estimated value for the dominant eigenvalue of the kernel matrix includes a first multiplication of a first row of the kernel by an estimated variable for the dominant eigenvector of the kernel matrix on a first hardware module, and a second multiplication of a second row of the kernel matrix by the estimated variable on a second hardware module, wherein the first and second multiplications overlap in time with one another;

wherein the first and second hardware modules are a hardware accelerator;

wherein the instructions, when executed by the computer, cause the computer to perform the following further steps comprising:

measuring, by a first sensor, NOx emissions in exhaust gas conducted by an internal combustion engine via an exhaust-system branch, upstream of a catalytic converter, wherein the first sensor is situated in the exhaust-system branch between the internal combustion engine and the catalytic converter;

wherein the presetting of the input for the Gaussian process presets the input to the measured NOx emissions from the first sensor;

wherein the determining of the prediction for the expected value of the Gaussian process includes determining the prediction for the expected value of the Gaussian process depending on the at least one covariance from the positive semi-definite kernel matrix and depending on the inverse of the kernel matrix and depending on outputs from the data points and the measured NOX emissions;

determining, based on the prediction of the expected value of the Gaussian process, a probable output value of a second sensor; and controlling the internal combustion engine based on the probable output value of the second sensor.

16. A computer-implemented method, comprising:

presetting data points which each include pairs of mutually assigned input and output of a Gaussian process;

determining a positive semi-definite kernel matrix from inputs that are predetermined by the data points;

determining an inverse of the kernel matrix depending on an estimation for an inverse of a 1-Lipschitz mapping of the kernel matrix, which is scaled depending on an estimated value for a dominant eigenvalue of the kernel matrix;

presetting an input for the Gaussian process;

determining: (i) a prediction for an expected value of the Gaussian process depending on at least one covariance from the positive semi-definite kernel matrix and depending on the inverse of the kernel matrix and depending on outputs from the data points, and/or (ii) a prediction for a variance of the Gaussian process depending on at least one covariance from the positive semi-definite kernel matrix and depending on the inverse of the kernel matrix;

determining a probable output variable of a sensor and/or a control variable for a machine depending on at least one of the predictions;

determining a decomposition of the kernel matrix, which includes the estimated value for the dominant eigenvalue of the kernel matrix and the estimation for the 1-Lipschitz mapping of the kernel matrix;

determining the estimation for the inverse of the 1-Lipschitz mapping depending on the estimated value for the 1-Lipschitz mapping;

determining the inverse of the kernel matrix depending on the estimation for the inverse of the 1-Lipschitz mapping and depending on the estimated value for the dominant eigenvalue, the estimation for the inverse of the 1-Lipschitz mapping being scaled depending on the estimated value for the dominant eigenvalue;

wherein the determination of the estimated value for the dominant eigenvalue of the kernel matrix includes a first multiplication of a first row of the kernel by an estimated variable for the dominant eigenvector of the kernel matrix on a first hardware module, and a second multiplication of a second row of the kernel matrix by the estimated variable on a second hardware module, wherein the first and second multiplications overlap in time with one another;

wherein the first and second hardware modules are a hardware accelerator;

wherein the method further comprises:

acquiring at least one digital image using a camera of an at least partially autonomous robot, the at least digital image being at least one image of an area surrounding the robot;

wherein the presetting of the input for the Gaussian process presets the input to the acquired at least one digital image;

wherein the determining of the prediction for the expected value of the Gaussian process includes determining the prediction for the expected value of the Gaussian process depending on the at least one covariance from the positive semi-definite kernel matrix and depending on the inverse of the kernel matrix and depending on outputs from the data points and the acquired at least one digital image;

determining, based on the prediction of the expected value of the Gaussian process, a control variable for the robot; and controlling the robot based on the control variable.

\* \* \* \* \*